United States Patent [19]

Lee, Jr.

[11] 3,976,725

[45] Aug. 24, 1976

[54] HIGH IMPACT STRENGTH THERMOPLASTIC COMPOSITIONS

[75] Inventor: Gim F. Lee, Jr., Albany, N.Y.

[73] Assignee: General Electric Company, Pittsfield, Mass.

[22] Filed: Apr. 2, 1974

[21] Appl. No.: 457,173

Related U.S. Application Data

[62] Division of Ser. No. 183,630, Sept. 24, 1971, Pat. No. 3,819,671.

[52] U.S. Cl............................... 260/892; 260/876 R
[51] Int. Cl.$^2$.................... C08L 25/06; C08L 25/10
[58] Field of Search............................ 260/876, 892

[56] References Cited
UNITED STATES PATENTS

| | | | |
|---|---|---|---|
| 2,789,962 | 4/1957 | Groff et al. ......................... | 260/892 |
| 3,041,310 | 6/1962 | Luftglass et al. ................. | 260/880 R |
| 3,213,159 | 10/1965 | Adomaitis ....................... | 260/876 R |
| 3,226,453 | 12/1965 | Arnold et al. .................... | 260/876 R |

FOREIGN PATENTS OR APPLICATIONS

| | | | |
|---|---|---|---|
| 948,303 | 1/1964 | United Kingdom................ | 260/887 |

Primary Examiner—J. Ziegler
Attorney, Agent, or Firm—William F. Mufatti; Edward A. Hedman; Rocco S. Barrese

[57] ABSTRACT

There are provided high impact strength thermoplastic compositions comprising a polyphenylene ether and a rubber modified polystyrene resin, the polystyrene matrix in the composition having an intrinsic viscosity of at least 1.0 deciliters/gram. Such compositions, which contain polystyrene of substantially higher molecular weight than heretofore, provide molded articles with unexpected improvements in impact resistance, surface appearance and resistance to aggressive solvent systems. Also provided are high impact compositions, useful per se or for blending with polyphenylene ethers, comprising polyblends of rubber dispersed in a polystyrene matrix, the polystyrene having an intrinsic viscosity of at least 1.0 deciliters/gram.

4 Claims, No Drawings

HIGH IMPACT STRENGTH THERMOPLASTIC COMPOSITIONS

This is a division of application Ser. No. 183,630, filed Sept. 24, 1971, now U.S. Pat No. 3,819,671.

This invention relates to thermoplastic resin compositions and, more particularly, to high impact thermoplastic compositions comprising a polyphenylene ether and a rubber modified polystyrene resin, in which the intrinsic viscosity of the polystyrene in the matrix is at least about 1.0 deciliters/gram.

BACKGROUND OF THE INVENTION

The polyphenylene ethers are known and described in numerous publications, including Hay, U.S. Pat. Nos. 3,306,874 and 3,306,875; and Stamatoff, U.S. Pat. Nos. 3,257,357 and 3,257,358, all incorporated herein by reference. They are useful for many commercial applications requiring high temperature resistance and, because they are thermoplastic, they can be formed into films, fibers and molded articles. In spite of these desirable properties, parts molded from polyphenylene ethers are somewhat brittle due to poor impact strength. In addition, the relatively high melt viscosities and softening points are considered a disadvantage for many uses. Films and fibers can be formed from polyphenylene ethers on a commercial scale using solution techniques, but melt processing is commercially unattractive because of the required high temperatures needed to soften the polymer and the problems associated therewith such as instability and discoloration. Such techniques also require specially designed process equipment to operate at elevated temperatures. Molded articles can be formed by melt processing techniques, but, again, the high temperatures required are undesirable.

In addition, although the polyphenylene ether resins have outstanding hydrolytic stability, making them very useful in contact with aqueous media, e.g., in dishwasher and laundry equipment, they will soften or dissolve in contact with many aggressive solvents, e.g., halogenated or aromatic hydrocarbons and gasoline, which limits their use in automotive applications.

It is known in the art that the properties of the polyphenylene ethers can be materially altered by forming compositions with other polymers. For example, Finholt, U.S. Pat. No. 3,379,792, discloses that flow properties of polyphenylene ethers are improved by preparing a composition thereof with from about 0.1 to 25 parts by weight of a polyamide. In Gowan, U.S. Pat. No. 3,361,851, polyphenylene ethers are formed into compositions with polyolefins to improve impact strength and resistance to aggressive solvents. In Cizek, U.S. Pat. No. 3,383,435, incorporated herein by reference, there is provided a means to simultaneously improve the melt processability of the polyphenylene ethers and upgrade many properties of polystyrene resins. The Cizek patent disclosed that polyphenylene ethers and polystyrene resins, including many modified polystyrenes, are combinable in all proportions to provide compositions having many properties improved over those of either of the components.

Preferred embodiments of the Cizek patent are compositions comprising a rubber modified high-impact polystyrene and a poly-(2,6-dialkyl-1,4-phenylene)ether. Such compositions are important commercially because they provide both an improvement in the melt processability of the polyphenylene ether and an improvement in the impact resistance of parts molded from the compositions. Furthermore, such compositions of the polyphenylene ether and the rubber modified high-impact polystyrene may be custom formulated to provide pre-determined properties ranging between those of the polystyrene resin and those of the polyphenylene ether by controlling the ratio of the two polymers. The reason for this is that the Cizek compositions exhibit a single set of thermodynamic properties rather than the two distinct sets of properties i.e., one for each of the components of the composition, as is typical with compositions or blends of the prior art.

The preferred embodiment of the Cizek patent is disclosed to comprise poly(2,6-dimethyl-1,4-phenylene)ether and a rubber modified high-impact polystyrene (identified in Example 7 as Lustrex HT88-1 of Monsanto Chemical Company). It is known in the art that Monsanto HT-88 high impact polystyrene contains an elastomeric gel phase dispersed through a polystyrene matrix and that this elastomeric phase comprises about 20.7% by weight of the composition. In addition, it is known that in the gel free polystyrene matrix in Lustrex 88, the weight average molecular weight, $\overline{M}_w$, is about 251,000 and the number average molecular weight, $\overline{M}_n$, is about 73,000, and, therefore, the polydispersity, i.e., the ratio $\overline{M}_w/\overline{M}_n$ is about 3.44. This is shown, for example, in Table 3 in Vol. 13, Encyclopedia of Polymer Science and Technology, 1970, p. 401 et seq. Thus the preferred embodiment of the Cizek patent, which was disclosed to have a notched Izod impact strength ranging from 1.0 to 1.5 ft.lbs./in. notch (Standard Method, ASTM-D-256) comprised a polyphenylene ether and a rubber modified high-impact polystyrene resin, the polystyrene in the matrix having a weight average molecular weight of about 251,000.

The Staudinger equation $$[\eta] = KM^a$$

wherein $[\eta]$ is the intrinsic viscosity, K is a constant, M is the molecular weight (close to the weight average) and $a$ is a constant depending on the system, is used by those skilled in the art to determine relative molecular weights in a given polymer system. For the purposes of this disclosure, the relative molecular weights of the matrix polystyrene will be discussed in terms of intrinsic viscosity. The intrinsic viscosity of a polymer solution is usually estimated by determining the specific viscosity at several low concentrations and extrapolating the values to zero concentration. Determined in known ways, the intrinsic viscosity of the matrix in Lustrex HT-88 is of the order of 0.8 deciliters/gram.

It is generally recognized that the properties of impact resistant polystyrenes are highly dependent on the number, size and character of dispersed elastomeric particles. Moreover, while most commercial impact polystyrenes contain from 3 to 10% by weight of a dispersed rubber phase comprising particles of polybutadiene or rubbery butadiene-styrene copolymer, the polystyrene in the matrix usually has a limited distribution of weight average molecular weights and, especially, the upper limit appears to be about 260,000 (the same as Lustrex-88 used in Cizek). By way of illustration, the four commercial products shown in the Encyclopedia of Polymer Science and Technology, Interscience, Vol. 13, p. 400 (1970), Table 3 have $\overline{M}_w$ values of 209,000; 251,000; 252,000 and 164,000.

Moreover, as part of a study of the effect of the molecular weight distribution of the matrix polystyrene in high impact polystyrenes, Wagner et al., Encyclopedia of Rubber Technology, Vol. 43, 1970, p. 1136, stated as a generally recognized fact that commercial thermally initiated impact polystyrenes have a weight average molecular weight, $\overline{M}_w$, in the range of 250,000. Proceeding from this point, Wagner et al blended in increasing amounts of polystyrene of higher molecular weight, $\overline{M}_w$, 305,000 (intrinsic viscosity of about 0.90). In so doing, the rubber content was decreased, and there was found a gradual decrease in properties, particularly in impact strength.

These combined teachings indicate that increasing the molecular weight of the polystyrene in the matrix of the rubber modified polystyrene used in the Cizek embodiments would not increase the physical properties of the composition with polyphenylene ether resins, but would tend to cause them gradually to decrease.

In view of the above, it has now unexpectedly been found that compositions of a polyphenylene ether with a rubber modified polystyrene resin can be provided with substantially improved impact strengths if the polystyrene matrix phase has an intrinsic viscosity of at least 1.0 deciliters/gram measured in chloroform at 30°C. Correspondingly, the weight average molecular weight, $\overline{M}_w$, is above 350,000, which is substantially above the 305,000 in the additive used by Wagner et al., and the range of 164,000–252,000 used in the prior art.

In addition, in such compositions, the surface appearance, especially gloss, is unexpectedly improved, as is the resistance to aggressive solvents, such as gasoline.

With respect to gasoline resistance, it is disclosed in the Cizek patent that this can be improved by using as the polystyrene resin component, in combination with the polyphenylene ether resin a copolymerized alkenyl cyanide, such as acrylonitrile, either in the rubber backbone or copolymerized with the styrene. Without such an expedient, the styrene resins used in the Cizek compositions, e.g., Styron-666 and Lustrex HT-88, provide molded parts which have poor gasoline resistance, precluding their use in many applications, particularly automotive uses.

It has also now been discovered that the gasoline resistance of polyphenylene ether resins and blends thereof with styrene resins is remarkably improved if the molecular weight of polystyrene in the matrix is significantly increased above that in the commercial products and those shown in the prior art. While the prior art compositions, which have polystyrene matrix intrinsic viscosities in the range 0.75–0.90, provide 40/60 and 40/65 compositions with poly(2,6-dimethyl-1,4-phenylene)ether that fail catastrophically in gasoline at 1% strain in 10–15 seconds, if the intrinsic viscosity is increased to above 1.0, in accordance with this invention, no failure, is seen even after 30 minutes.

DESCRIPTION OF THE INVENTION

According to the present invention, in its broadest aspects, there are provided thermoplastic compositions with unexpectedly high impact resistance and resistance to aggressive solvents comprising a polyphenylene ether, and a rubber modified polystyrene, the polystyrene matrix in the composition having an intrinsic viscosity of at least about 1.0, and preferably about 1.0 to 1.5 deciliters/gram. For uniformity, the intrinsic viscosities are to be measured in chloroform at 30°C.

Preferably the polystyrene in the matrix has a broad molecular weight distribution, with a polydispersity, i.e., $\overline{M}_w/\overline{M}_n$ ratio of at least 3.5. In general, the compositions according to this invention are prepared by combining the polyphenylene ether and a rubber modified polystyrene resin to obtain a composition having at least two phases, one of which is discontinuous and comprises rubber particles. The other phase is a matrix of polyphenylene ether and polystyrene resin. Such compositions may be molded to shape using conventional molding procedures. Preferably the rubber is a diene rubber.

Therefore, according to a preferred aspect of this invention, there are provided high impact strength thermoplastic compositions comprising
 a. a polyphenylene ether and
 b. a rubber modified polystyrene resin,
the rubber modified polystyrene containing an elastomeric phase dispersed in a polystyrene matrix, the rubber being a polystyrene grafted diene rubber and the polystyrene in the matrix having an intrinsic viscosity of at least about 1.0. Preferably the rubber content of the composition is from 4 to 20% and especially preferably, it is from about 6 to 12%, based on the resinous components in the composition.

Methods to determine the intrinsic viscosity of the polystyrene matrix are well known to those skilled in the art. One convenient method comprises separating first any gel phase from the rubber modified polystyrene by high speed centrifugation. In one procedure, a 5% by weight suspension of rubber modified polystyrene is kept in contact with a mixture of methyl ethyl ketone and acetone (50/50 by volume) for 90 minutes with mild shaking. Then it is centrifuged at 47,000 × G (19,500 r.p.m.) at 10°C. Any gel phase is recovered by decanting and vacuum drying at 50°C. The polystyrene is recovered by precipitating with methanol from the centrifugate. Solutions are made up in chloroform and the intrinsic viscosities are determined at high dilutions at 30°C. by standard methods. On the other hand, if the rubber is combined by mechanical blending into the styrene resin, the intrinsic viscosity is easily measured beforehand, and a blending method is used to insure that the molecular weight of the polystyrene is not degraded.

As has been mentioned, preferred compositions are made from polystyrene and rubber in which the styrene phase has a polydispersity of greater than 3.5 and, especially preferably, from about 3.5 to about 5.0. The term polydispersity means the ratio of weight average molecular weight to number average molecular weight — the higher the ratio, the broader the range of molecular weights. Impact resistance, especially, seems to be highest at a given rubber content when the polydispersity is greater than 3.5.

Polydispersity can be determined in ways known to those skilled in the art. For example, the ratio is conveniently measured by gel permeation chromatography.

The compositions of this invention generally consist of a mixture of two phases, the continuous phase being a matrix of polyphenylene oxide resin and styrene resin in which there is a discontinuous rubbery phase dispersed comprising particles of elastomer. Such particles may also include to varying extents polyphenylene ether resins, depending upon how the compositions are prepared. If the particles are prepared by grafting, in general, it is preferred that they include a minor proportion, e.g., up to about 50% by weight of ungrafted polystyrene. In a typical particle there may be, for example, up to about 45% by weight of rubber, about 10% or more by weight of grafted polystyrene and up to about 50% by weight of occluded, ungrafted styrene resin. The ungrafted styrene resin in the gel will have an intrinsic viscosity of the order of that in the matrix.

The present compositions are most conveniently prepared by combining a rubber modified polystyrene resin with the polyphenylene ether. The particles of the elastomer are provided, e.g., by polyblending, i.e., mechanically mixing the components or by chemical interpolymerization, e.g., by polymerizing styrene in the presence of dissolved rubber under well known conditions whereby a dispersed microgel of, e.g., polystyrene grafted, cross-linked rubber particles becomes dispersed in a polystyrene matrix. With polyblending, the rubber particles will have little or no gel and in such compositions there will be no polystyrene grafted gel phase — although in all such composition, interpolymerization between the polyphenylene ether-polystyrene and/or the rubber can occur. These rubber modified polystyrene resins are then combined with the polyphenylene ether resins and the amount of rubber in the final composition is directly related to the amount of rubber modified polystyrene used. In addition, if blending is carried out, according to conventional procedures, permitting little or no degradation in molecular weights, the polystyrene matrix will have the intrinsic viscosity corresponding to that which is used to make up the present compositions.

The polyphenylene ethers with which this invention is concerned are fully described in the above-mentioned references. The polyphenylene ether are self-condensation products of monohydric monocyclic phenols produced by reacting the phenols with oxygen in the presence of complex copper catalysts. In general, molecular weight will be controlled by reaction time, longer times providing a higher average number of repeating units.

A preferred family of polyphenylene ethers will have repeating structural units of the formula:

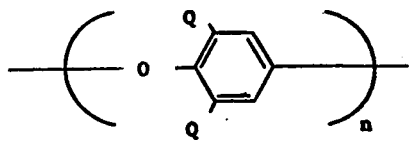

wherein the oxygen ether atom of one unit is connected to the benzene nucleus of the next adjoining unit, $n$ is a positive integer and is at least 50, and each Q is a monovalent substituent selected from the group consisting of hydrogen, halogen, hydrocarbon radicals free of a tertiary alpha-carbon atoms, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

Illustrative members are: poly(2,6-dilauryl-1,4-phenylene) ether; poly(2,6-diphenyl-1,4-phenylene)ether; poly(2,6-dimethoxy-1,4-phenylene)ether; poly(2,6-diathoxy-1,4-phenylene)ether; poly-(2-methoxy-6-ethoxy-1,4-phenylene)ether; poly(2-ethyl-6-stearyloxy-1,4-phenylene)ether; poly(2,6-dichloro-1,4-phenylene)ether; poly-(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene)ether; poly(2,5-dibromo-1,4-phenylene)ether; and the like. Examples of polyphenylene ethers corresponding to the above formula can be found in the above referenced patents of Hay and Stamatoff.

For purposes of the present invention an especially preferred family of polyphenylene ethers include those having alkyl substitution in the two positions ortho to the oxygen ether atom, i.e., those of the above formula wherein each Q is alkyl, most preferably having from 1 to 4 carbon atoms. Illustrative members of this class are: poly(2,6-dimethyl-1,4-phenylene)ether; poly(2,6-diethyl-1,4-phenylene)ether; poly(2-methyl-6-ethyl-1,4-phenylene) ether; poly(2-methyl-6-propyl-1,4-phenylene)ether; poly(2,6-dipropyl-1,4-phenylene)ether; poly(2-ethyl-6-propyl-1,4-phenylene) ether; and the like.

The most preferred polyphenylene ether resin for purposes of the present invention is poly(2,6-dimethyl-1,4-phenylene)ether. This resin readily forms a compatible and single phase composition with polystyrene resins over the entire range of combining ratios.

In the present compositions, the polyphenylene ether is combined with a styrene resin and a rubber. Suitable resins for the polystyrene matrix are shown in Cizek, U.S. Pat. No. 3,383,435. However, they will all have an intrinsic viscosity higher than usual, i.e., at least 1.0, and will have a weight average molecular weight of at least 350,000 and, preferably a high polydispersity, i.e., a broad variance between molecular weight fractions, around the 350,000 and above average minimum level. Such resins will be combinable with the polyphenylene ether and, in general, will be selected from those having at least 25% by weight of the polymer units derived from a vinyl aromatic monomer, e.g., one having the formula:

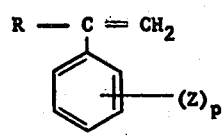

wherein R is hydrogen, (lower)alkyl, e.g., of from 1 to 4 carbon atoms or halogen; Z is hydrogen, vinyl, halogen or (lower)alkyl; and $p$ is O or a whole number of from 1 to 5. Illustrative polystyrene resins include homopolymers of polystyrene; polychlorostyrene; poly-α-methylstyrene; and the like, styrene-containing copolymers, such as styrene-acrylonitrile copolymers; copolymers of ethylvinylbenzene and divinylbenzene; styrene-acrylonitrile-α-methylstyrene terpolymers; and the like. Preferred polystyrene resins of this class are homopolystyrene; poly-α-methylstyrene; styrene-acrylonitrile copolymers; styrene-α-methylstyrene copolymer; styrene-methyl methacrylate copolymer; and poly-α-chlorostyrene. Especially preferred as the monomer for preparing the present compositions is styrene monomer.

The "rubber" used to modify the polystyrene resin includes polymeric materials, natural and synthetic, which are elastomers at room temperature, e.g., 20° to 25°C. The term "rubber" includes, therefore, natural or synthetic rubbers of the diene elastomer type generally used in preparing impact polymers. All such rubbers will form a two phase system with the polystyrene resin, and will comprise the discontinuous particulate rubbery phase in both the impact resistant styrene resin and the polyphenylene ether-polystyrene-rubber compositions of this invention.

Illustrative rubbers for use in this invention are natural rubber and polymerized diene rubbers, e.g., polybutadiene, polyisoprene, and the like, and copolymers of such dienes with vinyl monomers, e.g., vinyl aromatic monomers, such as styrene. Examples of suitable rubbers or rubbery copolymers are natural crepe rubber, synthetic SBR type rubber containing from 40 to 98% by weight of butadiene and from 60 to 2 percent by weight of styrene prepared by either hot or cold emulsion polymerization, synthetic GR-N type rubber containing from 65 to 82 percent by weight of butadiene and from 35 to 18 percent by weight of acrylonitrile, and synthetic rubbers prepared from, for example, butadiene, butadiene-styrene or isoprene by methods, e.g., those employing heterogeneous catalyst systems, such as a trialkylaluminum and a titanium halide. Among the synthetic rubbers which may be used in preparing the present compositions are elastomeric modified diene homopolymers, e.g., hydroxy- and carboxy-terminated polybutadienes; poly-chlorobutadienes, e.g., neoprenes; copolymers of dienes, e.g., butadiene and isoprene, with various comonomers, such as alkyl unsaturated esters, e.g., methyl methacrylate; unsaturated ketones, e.g., methylisopropenyl ketone, vinyl heterocyclics, e.g., vinyl pyridine; and the like. The preferred rubbers comprise polybutadiene and rubbery copolymers of butadiene with styrene. Such preferred rubbers are widely used in forming rubber modified high impact polystyrene resins with the range of matrix polystyrene intrinsic viscosities and molecular weights mentioned in the above-cited references.

The term "rubber modified polystyrene resin" defines a class of compounds comprising a two-phase system in which rubber is dispersed in a polystyrene resin matrix in the form of discrete particles. The particles can be formed by a mechanical blending of the rubber and the polystyrene resin and, if a cross-linking agent, e.g., a sulfur is present, the particles will comprise a dispersed gelled elastomeric phase. On the other hand, the two-phase system will consist of interpolymers of a styrene monomer and an elastomer or rubber. Commercially, such high impact polystyrenes are usually made by grafting of rubber in the presence of polymerizing styrene. Such systems consist of a continuous phase of the polymerized styrene monomer in which the rubber or elastomer is dispersed in a discontinuous elastomeric gel phase, in some cases without, but in most cases, and preferably, with grafted chains of polymerized vinyl aromatic, e.g., styrene, monomer. The particles will usually contain occluded, polymerized styrene monomer, too, and this can comprise up to about 50% of their weight, exclusive of grafted polystyrene.

Methods for the production of rubber modified polystyrenes for use in this invention, with the high molecular weight polystyrene matrix will be known to those skilled in the art. In general, if the particles of rubber are dispersed mechanically by blending rubber with polystyrene, a very high molecular weight crystal polystyrene will be used. These can be made by common techniques, e.g., bulk or suspension polymerization, the high molecular weight being achieved by the expedients of using very little or no catalyst, a lower than normal polymerization temperature, very little or no chain transfer agent, a substantially increased polymerization time, or a combination of any of the foregoing all of which are known to increase the molecular weight of the polystyrene.

One useful method, which will be exemplified hereinafter, provides a polystyrene with an intrinsic viscosity of a weight average molecular weight of 479,000, a number average molecular weight of 129,000, respectively.

Although such high molecular weight polystyrenes can be blended with rubber directly, it is more convenient, and preferred first to polyblend the rubber with a lower molecular weight polystyrene, e.g., intrinsic viscosity about 0.7–0.9 and $\overline{M}_w$, 115,000–300,000 and then to polyblend this with the high molecular weight polystyrene, to obtain any desired rubber content and a matrix intrinsic viscosity of at least 1.0, preferably from about 1.0 to 1.5 deciliters/gram, measured in chloroform at 30°C. Such compositions have high impact strength and excellent resistance to aggressive solvents per se and in combination with polyphenylene ether resins, and are contemplated by this invention. It is preferred that the rubber be a diene rubber, as hereinabove defined, and that it be present in an amount to provide from 4 to 20% of the total weight of the styrene resin plus the rubber in the composition.

Methods for preparing rubber modified polystyrenes with dispersed styrene grafted elastomeric particles are well known. The molecular weight in the polystyrene matrix can be increased by varying the polymerization conditions, e.g., by decreasing or eliminating catalyst, decreasing or eliminating chain transfer agent, lowering the temperature, increasing the polymerization time, blending in very high molecular weight styrene resin, as mentioned above. These expedients can be used in well known processes, such as that of Amos. et al., U.S. Pat. No. 2,694,692, in which polymerization of rubber in styrene monomer is carried out in bulk and the mixture is agitated during the beginning stages to form the desired amount of rubber particles and then stirring is reduced and polymerization is completed. Also useful is the method described in Stein et al., U.S. Pat. No. 2,886,553, in which a bulk pre-polymerization of rubber in styrene monomer is carried out with heating, agitating until the desired rubber particle content is obtained then water and surfactants are added and polymerization is completed in suspension. The rate of agitation in the prepolymerization step in both processes controls the grafted particle content. Such procedures with attention to the process variables mentioned above can readily provide rubber modified polystyrenes with intrinsic viscosities above 1.0. Such compositions, which are grafted products, in contrast to the polyblends mentioned above, are also commercially available from Koppers Company under product designation PRX-1004 and PRX-1005, intrinsic viscosities 1.07 and 1.22, respectively.

As is described in Cizek, U.S. Pat. No. 3,383,435, polyphenylene ethers and polystyrene resins are combinable with each other in all proportions and they exhibit a single set of thermodynamic properties. The present compositions therefore can comprise from 1 to 99% by weight polyphenylene ether resin and from 99 to 1% polystyrene resin, on a rubber-free basis, and these are included within the scope of the invention. In general, compositions in which the polystyrene resin, on a rubber-free basis, comprises from 20 to 80% by weight of the polystyrene and the polyphenylene ether, are preferred because after molding they have the best combination of impact strength, surface appearance and resistance to solvents. Particularly useful and preferred are compositions in which the polystyrene resin, on a rubber-free basis, comprises from 40 to 60% by weight of the combined weight of the polystyrene and the polyphenylene ethers. Properties, such as flexural strength, tensile strength, hardness and especially impact strength appear to be at a maximum in such preferred compositions.

The rubber phase, i.e., the weight percentage of the dispersed elastomeric phase, in the instant compositions can vary, although no advantage is secured in exceeding a maximum of about 30% by weight of the total weight of the composition. If the elastomeric phase content falls below about 0.1% by weight, impact properties decline. The preferred range of elastomeric gel phase content is from about 4 to about 20% by weight, with the higher amount being used when the rubber if dispersed by polyblending, i.e., mechanical blending. If, as is preferred, all of the rubber is in the form of an elastomeric polystyrene grafted diene rubber, the lower amounts can be advantageous. In all cases, the preferred amount of elastomeric phase will range between 6 and 12% by the total weight of the composition. Although, at higher levels, impact strength is clearly optimized, other properties, such as solvent resistance and appearance of molded parts are affected. Because the grafted rubber particles provide compositions with better impact strengths than those from mechanically blended, i.e., ungrafted but gelled, particles at the optimum level, the compositions of this invention containing particulate styrene grafted elastomer phase are especially preferred.

The method used to form the polyphenylene ether-polystyrene-rubber compositions of the invention is not critical provided that it permits efficient dispersion and mixing. The preferred method is one in which the polyphenylene ether is mixed with a polystyrene and a rubber or rubber modified polystyrene using any conventional mixing method and the composition so formed is molded to any desired shape such as by extrusion, hot molding, injection molding, and the like.

It should, of course, be obvious to those skilled in the art that the other additives may be included in the present compositions such as plasticizers, pigments, flame retardant additives, reinforcing agents, such as glass filaments or fibers, stabilizers and the like.

The following procedure illustrates the preparation of a very high molecular weight crystal polystyrene which is useful for forming polyblends with rubber, and ultimately for incorporation into the polyphenylene ether-polystyrene-rubber compositions of this invention.

PROCEDURE

A flask fitted with a stirrer, condenser and nitrogen flushing system is charged with 2000 ml. of distilled water, 50 g. of styrene monomer (washed free of inhibitor with dilute caustic solution), 2.0 g. of benzoyl peroxide initiator and 5 g. of gelatin. Polymerization is carried out in stirred suspension at 70°C. for 24 hours. The beads of polystyrene are removed by filtration, washed with water and vacuum dried. The yield is 92% of the theoretical, based on styrene monomer.

The product has weight and number average molecular weights of 479,000 and 129,000, respectively.

DESCRIPTION OF THE PREFERRED EMBODIMENTS

The invention will be further illustrated by the following examples wherein, unless otherwise indicated, all compositions are prepared by passing mixtures of the polyphenylene ether, the styrene resin and the rubber or the high-impact polystyrene and other ingredients, if present, through a variable pitch, single screw extruder with extrusion temperature maintained between about 450° and 600°F. All parts are by weight. The strands emerging from the extruder are cooled, chopped into pellets and molded into test bars using standard procedures. Izod impact strengths are determined on ⅛ inch thick specimens by ASTM D-256-56. Resistance to aggressive solvents is determined by placing ⅛ inch test piece in a jig under a 1% flexural strain and immersing it in gasoline. The time is noted for crazing or failure.

EXAMPLE 1

The following formulation is blended:

| Material | Parts |
|---|---|
| Poly(2,6-dimethyl-1,4-phenylene)ether* | 40 |
| Rubber modified polystyrene** | 65 |

*General Electric Company, PPO polyphenylene ether, in pellet form.
**Koppers Company, PRX-1004, high impact rubber modified polystyrene, in pellet form, containing about 7.5% by weight of polybutadiene in the form of a polystyrene grafted elastomeric phase dispersed in a matrix of polystyrene. The molecular weight of polystyrene in the matrix is determined by dissolving out the soluble fraction with 1:1 volume of methyl ethyl ketone and acetone, centrifuging to separate the insolubles, and precipitating the polystyrene from the centrifugate with methanol. The intrinsic viscosity is 1.07 deciliters/gram, measured in chloroform at 30°C., the number average molecular weight of the polystyrene in the matrix is about 96,800 and the weight average molecular weight is about 382,000 ($\overline{M}_w/\overline{M}_n = 3.95$).

The mixture is extruded in a ¾ inch Wayne extruder. The resultant strands are cooled, chopped into pellets and molded into test specimens.

The following physical properties are obtained:

| | |
|---|---|
| Izod impact (ft.lbs./in. notch) | 3.6 |
| Elongation to failure (%) | 59 |
| Tensile yield strength (psi) | 9600 |
| Tensile ultimate strength (psi) | 7400 |

The gasoline resistance is determined by immersion at 1% flexural strain. There is no crazing or failure after 30 minutes, when the test is terminated.

EXAMPLE 2

The following formulation is blended:

| Material | Parts by weight |
|---|---|
| Poly(2,6-dimethyl-1,4-phenylene) ether (as in Example 1) | 40 |
| Rubber modified polystyrene* | 65 |

*Koppers Company, PRX-1005, high impact rubber modified polystyrene, in pellet form, containing about 7.5% by weight of polybutadiene in the form of a polystyrene grafted elastomeric phase dispersed in a matrix of polystyrene. The intrinsic viscosity of the polystyrene matrix is 1.22; $\overline{M}_w$ is 489,000; $\overline{M}_n$ is 80,200 and $\overline{M}_w/\overline{M}_n$ is 6.1.

The following physical properties are obtained:

| | |
|---|---|
| Izod impact (ft.lbs./in. notch) | 3.82 |
| Elongation to failure (%) | 47 |
| Tensile yield strength (psi) | 9100 |

-continued

Tensile ultimate strength (psi)      7400

The gasoline resistance is measured at 1% flexural strain. There is no crazing or failure after 30 minutes, when the test is terminated.

COMPARATIVE EXAMPLES A–C

For purposes of comparison, the procedure of Example 1 is repeated substituting for the rubber modified high-impact polystyrene having a polystyrene matrix with intrinsic viscosity of 1.07, three commercially available rubber modified high impact polystyrenes having polystyrene intrinsic viscosities in the conventional range of about 0.8–0.9.

The following formulations are blended:

| Material | Parts by weight A | B | C |
|---|---|---|---|
| Poly(2,6-dimethyl-1,4-phenylene) ether (as in Example 1) | 40 | 40 | 40 |
| Rubber modified polystyrene (matrix [$\eta$], 0.87)* | 65 | | |
| Rubber modified polystyrene (matrix [$\eta$], 0.79)** | | 65 | |
| Rubber modified polystyrene (matrix [$\eta$], 0.80)*** | | | 60 |

*Koppers Company, Dylene 601, in pellet form, containing about 80% by weight of polybutadiene in the form of a polystyrene grafted elastomeric phase dispersed in a matrix of polystyrene. The intrinsic viscosity of the polystyrene matrix is 0.87.
**Cosden Chemical Corp., 825 TV, in pellet form containing about 8% by weight of polybutadiene in the form of a polystyrene grafted elastomeric phase dispersed in a matrix of polystyrene. The intrinsic viscosity of the polystyrene matrix is 0.79, $\overline{M}_w$, 276,000; $\overline{M}_n$ is 68,700, $\overline{M}_w/\overline{M}_n$ is 4.02.
***Monsanto Company, HT-91, in pellet form containing about 8% by weight of polybutadiene grafted elastomeric phase dispersed in a matrix of polystyrene. The intrinsic viscosity of the polystyrene matrix is 0.80, $\overline{M}_w$ is 240,000; $\overline{M}_n$ is 86,000 and $\overline{M}_w/\overline{M}_n$ is 2.79.

The following physical properties are obtained:

| | A | B | C |
|---|---|---|---|
| Izod impact (ft.lbs./in. notch) | 1.84 | 1.78 | 1.76 |
| Elongation to failure (%) | 46 | 19 | 30 |
| Tensile yield strength (psi) | 9000 | 9100 | 8400 |
| Tensile ultimate strength (psi) | 7600 | 7400 | 7800 |

In the gasoline immersion test at 1% strain, Sample A catastrophically failed in about 15 seconds, Sample B in less than 15 seconds and Sample C in less than 10 seconds.

A comparison of the results of Examples 1 and 2 with those of Samples A, B and C demonstrates that at approximately equal rubber contents and with about the same amount of polyphenylene ether, there has been obtained a substantial improvement in impact strength as measured in the Izod tests in the compositions which are prepared from the polystyrene having an intrinsic viscosity greater than 1.0. In addition there is an outstanding increase in resistance to gasoline when the molecular weight of the polystyrene is substantially above that found in the commercial products.

EXAMPLE 3

A high impact polystyrene composition with superior physical properties and solvent resistance is prepared by polyblending (using coextrusion):

| Material | Parts by weight |
|---|---|
| Rubber modified polystyrene* | 33 |
| Crystal polystyrene ([$\eta$]- 1.20)** | 67 |

*Union Carbide Co., TGD-2100, polystyrene containing 24% by weight of polybutadiene rubber.
**Crystal polystyrene, intrinsic viscosity of about 1.20, $\overline{M}_w$, 479,000; $\overline{M}_n$, 129,000; $\overline{M}_w/\overline{M}_n$, 3.7.

This material, in which the matrix polystyrene has an intrinsic viscosity of greater than 1.0, is molded and the properties are compared with those of a commercial high impact polystyrene (Monsanto Company, HT-91) which also has about 8% by weight of rubber, but in the form of grafted particles. The intrinsic viscosity and weight and number average molecular weight of the polystyrene matrix in HT-91 are 0.80 dl./g.; 240,000 and 86,000, respectively.

The following physical properties are obtained:

| Properties | Polyblend of this invention | Commercial Graft polymer |
|---|---|---|
| Izod impact strength (ft.lbs./in. notch) | 2.6 | 1.5 |
| Tensile yield strength (psi) | 5200 | 6600 |
| Elongation at failure, % | 42 | 26 |
| Flexural modulus (psi) | 344000 | 312000 |

At 1% flexural strain in gasoline the commercial graft polymer failed catastrophically, whereas the polyblend according tok this invention did not show any cracks or crazes in 10 minutes, although the surface was slightly tacky.

The above properties demonstrate that increasing the molecular weight of the polystyrene and polyblending provides superior impact strength, elongation and flexural modulus. The composition also has substantially increased resistance to attack by gasoline.

EXAMPLE 4

The following formulation is blended:

| Materials | Parts by weight |
|---|---|
| Poly(2,6-dimethyl-1,4-phenylene) ether (as in Example 1) | 40 |
| Rubber modified polystyrene (Union Carbide (TGD-2100, as in Example 3) | 20 |
| Crystal polystyrene ([$\eta$], 1.20 as in Example 3) | 40 |

The composition has higher impact strengths than corresponding compositions in which the polystyrene in the matrix has an intrinsic viscosity of below about 1.0 and excellent resistance to gasoline.

EXAMPLE 5

The procedure of Example 1 is repeated, substituting for the polystyrene modified with polybutadiene, a polystyrene containing 9% by weight of rubber derived from a rubbery styrene butadiene copolymer containing 77% of butadiene units and 23% of styrene units, by weight. The intrinsic viscosity of the polystyrene matrix is greater than 1.0. The impact strength of the composition is high.

EXAMPLE 6

The following polyphenylene ethers are substituted for poly(2,6-dimethyl-1,4-phenylene)ether in the formulation of Example 1:

poly(2,6-diethyl-1,4-phenylene)ether;
poly(2-methyl-6-ethyl-1,4-phenylene)ether;
poly(2-methyl-6-propyl-1,4-phenylene)ether;
poly(2,6-dipropyl-1,4-phenylene)ether
poly(2-ethyl-6-propyl-1,4-phenylene)ether.

Compositions according to this invention are obtained.

Obviously, other modifications and variations of the present invention are possible in the light of the above teachings. It is, therefore, to be understood that changes may be made in the particular embodiments of the invention described which are within the full intended scope of the invention as defined by the appended claims.

I claim:

1. A high impact strength thermoplastic composition consisting essentially of a polyblend of ungrafted particulate rubber dispersed in a polystyrene homopolymer matrix, the polystyrene in said matrix having an intrinsic viscosity of at least about 1.0 deciliter/gram, measured in chloroform at about 30°C, and wherein said rubber comprises from 4 to 20% of the total weight of the composition.

2. A composition as defined in claim 1 wherein the polystyrene matrix has an intrinsic viscosity in the range of from 1.0 to 1.5 deciliters/gram.

3. A composition as defined in claim 1 wherein said rubber is a diene rubber.

4. A composition as defined in claim 1 wherein said ungrafted rubber is selected from the group consisting of polybutadiene and a copolymer of butadiene with styrene.

* * * * *